Patented Feb. 15, 1944

2,341,873

UNITED STATES PATENT OFFICE 2,341,873

SEPARATION OF NICKEL FROM ORES

Alan Kissock, Laurelton, N. J.

No Drawing. Application February 12, 1943,
Serial No. 475,657

2 Claims. (Cl. 75—114)

This invention relates to a process for the separation of nickel, together with cobalt and copper only if present therewith, from ores in which these metals are associated with a material percentage of iron.

Whereas my patent, U. S. #2,205,565, discloses that sulphides of nickel, cobalt and copper may be oxidized to soluble salts by means of an aqueous solution containing one or more derivatives of chlorine monoxide, I have now discovered that these metals, reduced substantially to their elemental state, may in like manner be even more economically converted to soluble salts thereof.

It will be understood that nickel, as hereinafter employed, includes such cobalt and copper as may be present in the ores of this metal, and further that this invention is not limited to any method of roasting, reduction or other mechanical procedures which are used descriptively hereafter only as characteristic of a satisfactory means of accomplishing the purpose set forth.

If, in description of my process I select, for example a pyrrhotitic ore or concentrate containing nickel in relatively low percentage in comparison to iron, its sulphur content must first be removed to within practicable limits by means of an oxidizing roast. If an oxidized, but otherwise somewhat similar ore be selected, for example of the garnierite type, this preliminary roast may be eliminated.

Having thus an ore, or product containing the oxides of nickel and iron it is then necessary to bring about reduction by heating the ore in the presence of a reducing agent containing, for example sulphur, carbon or hydrogen in solid, liquid or gaseous form.

Subsequent to reduction as described, the ore is subjected to an aqueous solution containing a derivative of chlorine monoxide, for instance hypochlorous acid, or sodium hypochlorite adjusted to a pH of less than 5, and the soluble salts of nickel and iron so formed separated from the insoluble gangue by filtration or decantation.

To separate nickel from the soluble salts of nickel and iron so obtained, I have further discovered that this solution may be evaporated and the residual salts therefrom heated in air to decompose the iron salt, but not that of nickel, into a water insoluble compound. The heated residue may then be taken up in water, the soluble nickel salt separated from the insoluble iron by filtration or decantation and the nickel recovered from its substantially pure solution by any well known and available procedure.

Having thus described the sequence of steps of my process there follows a more specific example. A concentrate analyzing, for instance 1.5% nickel, 0.5% cobalt, 1.0% copper, 50% iron and 30% sulphur is roasted in air in a suitable furnace to a calcine containing less than 2% sulphur. If subsequent reduction is to be accomplished by means of sulphur, it is desirable to leave a somewhat higher residual sulphur in the calcine for this purpose. The oxidized, or roasted ore is then reduced by subjecting it to the action of a reducing agent, for example carbon or a hydrocarbon in sufficient amount, at a temperature of less than 1600 degrees F. and only until the nickel is substantially converted to its elemental state. Under these conditions the iron is not essentially reduced below an oxide which may be expressed by the formula $Fe_3O_4$. The reduced ore may then be pulverized and agitated in water, or for example in a 10% solution of caustic soda, into either of which chlorine gas is introduced. The hypochlorous acid or sodium hypochlorite thus respectively produced dissolve substantially all of the nickel but only a small percentage of the iron present in the ore. The solution containing soluble salts of nickel and iron, after separation from the insoluble iron and gangue by filtration and decantation, is then evaporated to dryness. The residual nickel and iron salts from evaporation are heated in air at a temperature of less than 1000 degrees F. under which conditions the iron salt is decomposed to a water insoluble compound whereas the nickel salt remains water soluble. The final residue so obtained is therefore taken up in water and the soluble nickel salt filtered or decanted from the insoluble iron compound thus providing effective and complete separation of nickel from iron. The nickel may then be recovered from this substantially pure solution by any well known and available procedure.

The terms used in describing and claiming this invention have been used in their descriptive sense and not as terms of limitation and it is intended that all equivalents of the terms used be included within the scope of the appended claims.

I claim:

1. A process for the separation of nickel, together with cobalt and copper when associated therewith, from ores containing a relatively high percentage of iron, which comprises reduction of the oxides of nickel, cobalt and copper, but not the oxide of iron, substantially to the metallic state and subjecting the reduced ore to an aqueous solution which contains hypochlorous acid.

2. A process for the separation of nickel, together with cobalt and copper when associated therewith, from ores containing a relatively high percentage of iron, which comprises reduction of the oxides of nickel, cobalt and copper, but not the oxide of iron, substantially to the metallic state, subjecting the reduced ore to an aqueous solution which contains hypochlorous acid, evaporating the solution therefrom and heating the residue so obtained in air until the iron compound therein becomes insoluble in water.

ALAN KISSOCK.